United States Patent [19]

Matsuo et al.

[11] Patent Number: 5,512,626
[45] Date of Patent: Apr. 30, 1996

US005512626A

[54] RUBBER COMPOSITIONS FOR BASE TREAD AND TIRES USING THE SAME

[75] Inventors: Toshiro Matsuo, Kakogawa; Naohiko Kikuchi, Akashi, both of Japan

[73] Assignee: Sumitomo Rubber Industries, Ltd., Hyogo, Japan

[21] Appl. No.: 319,644

[22] Filed: Oct. 7, 1994

[30] Foreign Application Priority Data

Oct. 12, 1993 [JP] Japan .................................. 5-254449

[51] Int. Cl.⁶ .............................. C08L 7/00; C08L 9/00; C08L 3/04; B60C 1/00
[52] U.S. Cl. .......................... 524/495; 525/99; 525/194; 525/195; 525/196; 525/236; 525/237; 525/901; 152/209 R
[58] Field of Search .............................. 525/99, 237, 236, 525/196; 152/209 R; 524/495, 505

[56] References Cited

U.S. PATENT DOCUMENTS

| | | |
|---|---|---|
| 3,157,218 | 11/1964 | Brown . |
| 4,417,027 | 11/1983 | Kan et al. . |
| 4,444,236 | 4/1984 | Kan et al. . |
| 4,482,678 | 11/1984 | Farukawa et al. . |
| 4,510,291 | 4/1985 | Kawakami . |
| 4,526,934 | 7/1985 | Oshima et al. . |
| 4,553,578 | 11/1985 | Vitus et al. . |
| 4,575,534 | 3/1986 | Oshima et al. . |
| 4,611,030 | 9/1986 | Kan et al. . |
| 4,822,844 | 4/1989 | Kawakami et al. . |
| 4,942,197 | 7/1990 | Yoshida et al. . |

FOREIGN PATENT DOCUMENTS

| | | |
|---|---|---|
| 0089839 | 9/1983 | European Pat. Off. . |
| 2490651 | 3/1982 | France . |
| 2603592 | 3/1988 | France . |

OTHER PUBLICATIONS

Eng. Uses of Rubber—McPherson et al.—pp. 228–293.

*Primary Examiner*—Carman J. Seccurro, Jr.
*Attorney, Agent, or Firm*—Birch, Stewart, Kolasch & Birch

[57] ABSTRACT

Rubber composition for a base tread, which is obtainable by blending, per 100 parts by weight of a rubber component, 30 to 55% by weight of a carbon black having an iodine adsorption value of from 40 to 100 g/kg, wherein the rubber component comprises (A) 20 to 55% by weight of a star shaped solution-polymerized butadiene rubber and (B) 45 to 80% by weight of a natural rubber or a natural rubber containing a diene rubber other than a star shaped solution-polymerized rubber in an amount of not more than 50% by weight. When using the above-mentioned rubber composition for the base tread of a base portion of a tread having a cap/base two-layer structure, it is possible to save fuel consumption of the tire because of small deformation and uniform shape.

8 Claims, No Drawings

RUBBER COMPOSITIONS FOR BASE TREAD AND TIRES USING THE SAME

BACKGROUND OF THE INVENTION

The present invention relates to a rubber composition for a base tread and a tire using the rubber composition, more specifically, a tire of a two-layer structure, which not only achieves of fuel consumption but also reduces deformation of an extruded tread in forming tires and assures uniformity after vulcanization, and a rubber composition for a base tread used for a base portion of a tread of the tire.

In recent years, demands for saving of resources and energy have been increasing throughout the world. In the course of developments of car tires and electric car tires which can decrease energy loss and decrease fuel consumption, various studies have been made specifically as to a tire tread structure and rubber materials used for the tread.

For instance, there are proposed ideas to save fuel consumption, such as a fuel saving tire which has a tread of two-layer structure comprising a cap portion and a base portion instead of a tread of a conventional one-layer structure and is provided with a fuel saving rubber on the base portion of the tread (JP-B-12244/1985, JP-B-45961/1988, and JP-B-33361/1989), and a styrene-butadiene copolymer rubber (JP-A-100 112/1982 and JP-A-179212/1982) which is obtained by solution polymerization in an organic solvent with the use of organolithium compound as a catalyst and is used for the cap portion of the above-mentioned tread.

Another idea for reducing fuel consumption is the use of a rubber composition prepared by blending a small amount of a carbon black as a reinforcing material, in a rubber such as a natural rubber, synthesized isoprene rubber and butadiene rubber, used for the base portion of the tread having the above-mentioned two-layer structure.

Certainly the problems of tires having a conventional one-layer structure, such as increase in rolling resistance and lowering of grip characteristic, are solved and fuel saving can be achieved to a considerable extent. In cases of the above-mentioned fuel saving tires, fuel saving rubbers one employed for the base portion, styrene-butadiene copolymer rubber for the cap portion of the tread, and a rubber composition prepared by blending a small amount of a carbon black in a rubber such as a natural rubber, synthesized isoprene rubber and butadiene rubber is used for the base portion of the tread. However, contrarily there is a problem that uniformity of an overall shape of the tires becomes remarkably worse mainly due to non-uniformity of a base tread thickness.

Therefore further studies have been made as to how the above-mentioned lowering of uniformity of the overall tread shape occurs. It was found that there are some differences in a tread gauge distribution between a tire molded and vulcanized by the use of a nonvulcanized tread immediately after extension and cut, and a tire molded and vulcanized by the use of a nonvulcanized tread which has been allowed to stand for a while after extension. That is to say, when the nonvulcanized tread rubber is extruded and cut to a circumferential length for a tire and is allowed to stand, for instance, for from two or three hours to 24 hours, there occurs shrinkage at the cut portion in the extruding direction, a little expansion in the direction of width and in the direction of thickness. The extruded tread gauge changes due to such shrinkage. Furthermore it was confirmed that the degree of the shrinkage varies mainly with the components of a rubber composition being used for the base portion of the tread having a two-layer structure.

Therefore there is a desire to develop a tire and a rubber composition used for a base portion of a tread of the tire that not only reduced fuel consumption but also wherein tread gauge distribution scarcely changes and uniformity of shape after vulcanization is excellent, even if the tread rubber is allowed to stand for a while after extrusion and cutting, such that little shrinkage occurs, particularly on the base portion of the conventional tread having a two-layer structure.

SUMMARY OF THE INVENTION

The present inventors have made intensive studies in light of the above-mentioned prior arts in order to obtain a tire, which can not only achieve a saving of fuel but also have an excellent uniformity of shape after vulcanization, and also a rubber composition used for a base portion of a tread of the tire. As a result, such a tire and rubber composition were discovered, and then the present invention has been completed.

The present invention relates to a rubber composition for a base tread, which is obtainable by blending, per 100 parts by weight of a rubber component, 30 to 55 parts by weight of a carbon black having an iodine adsorption value of from 40 to 100 g/kg, wherein the rubber component comprises (A) 20 to 55% by weight of a star shaped solution-polymerized butadiene rubber having a rate of coupling with tin tetrachloride of not less than 25% and a molecular weight distribution (weight average molecular weight/number average molecular weight) of 1.2 to 3, and (B) 45 to 80% by weight of a natural rubber or a natural rubber containing a diene rubber other than a star shaped solution-polymerized rubber in an amount of not more than 50% by weight. The present invention also relates to a tire in which the above-mentioned rubber composition for the base tread is used for the base portion of the tread having the two-layer structure consisting of the cap portion and the base portion.

DETAILED DESCRIPTION

As mentioned above, the rubber composition for the base tread of the present invention is obtainable by blending, per 100 parts by weight of the rubber component, 30 to 55 parts by weight of carbon black having an iodine adsorption value of from 40 to 100 g/kg, wherein the rubber component comprises (A) 20 to 55% by weight of the star shaped solution-polymerized butadiene rubber having a rate of coupling with tin tetrachloride of not less than 25% and a molecular weight distribution (weight average molecular weight (hereinafter referred to as "Mw")/number average molecular weight (hereinafter referred to as "Mn")) of 1.2 to 3 and (B) 45 to 80% by weight of the natural rubber or the natural rubber containing the diene rubber other than the star shaped solution-polymerized rubber in an amount of not more than 50%.

The butadiene rubber as the rubber component used in the present invention is a star shaped solution-polymerized rubber of which molecular weight distribution (Mw/Mn) has two peaks by coupling subsequent to polymerization, and obtained by solution polymerization.

The star shaped solution-polymerized butadiene rubber can be obtained by a usual method by mixing an organic solvent such as a hydrocarbon solvent, for example, n-hexane, cyclohexane or tetrahydrofuran with butadiene or a mixture of butadiene and styrene, polymerizing the resulting mixture with the use of a polymerization initiator of a lithium compound or the like, for example, an alkyl lithium at the desired polymerizing temperature and time, and then coupling the obtained polymer with a coupling agent.

In the present invention, tin tetrachloride has an excellent reactivity with the carbon black during mixing and is used as the coupling agent, since the rubber coupled with tin tetrachloride tends to resist changes in shape from cold flow and further gives a low fuel consumption. The rate of coupling with tin tetrachloride is not less than 25%, preferably 30 to 60%. When less than 25%, the resistance of the obtained polymer to changes in shape from cold flow is lowered, which makes the polymer flow easily. The rate of coupling is a ratio of a polymer having a tin-butadienyl bond at the reactive end to a whole polymer.

The above-mentioned star shaped solution-polymerized butadiene rubber has a molecular weight distribution (Mw/Mn) of 1.2 to 3 g, preferably 1.5 to 2.5. When the molecular weight distribution (Mw/Mn) is less than 1.2, the processability of the obtained rubber composition for the base tread is lowered, and when more than 3, the rolling resistance of the tires manufactured by the use of the rubber composition for the base tread becomes larger. Also the above-mentioned molecular weight distribution curve has two peaks. When the peak appearing in the lower molecular weight region is smaller than the peak appearing in the higher molecular weight region, it indicates that the aforesaid rate of coupling is higher. In the present invention, there is no specific limitation as to the distance (difference between the molecular weights) of those two peaks and the difference in the height thereof.

It is also possible to replace a part of the star shaped solution-polymerized butadiene rubber with a star shaped solution-polymerized styrene-butadiene rubber. When using the star shaped solution-polymerized styrene-butadiene rubber alone, there is a tendency of making the rolling resistance worse as compared with the star shaped solution-polymerized butadiene rubber. Therefore, the amount of the star shaped solution-polymerized styrene-butadiene rubber is at most one half of the star shaped solution-polymerized butadiene rubber. The content of styrene of the star shaped solution-polymerized styrene-butadiene copolymer rubber is not more than 18% by weight, preferably not more than 15% by weight. When the above-mentioned content of styrene is more than 18% by weight, the rolling resistance of the tires manufactured by using the obtained rubber composition becomes larger. In order to lower the content of styrene of the star shaped solution-polymerized styrene-butadiene copolymer rubber down to not more than 18% by weight, the blending ratio of styrene to butadiene may be adjusted at the time of the above-mentioned solution polymerization.

Also the amount of a vinyl bond of butadiene of the aforesaid star shaped solution-polymerized styrene-butadiene copolymer rubber is 15 to 65% by weight, preferably 20 to 60% by weight. When the amount of the vinyl bond is less than 15%, the rubber will be difficult to produced as a copolymer rubber. When more than 65%, tear strength and tensile strength of the obtained vulcanized rubber is lower, and the glass transition temperature of the polymer rises too high, which leads to a too large a rolling resistance of the tires manufactured by using the rubber composition.

The rubber component of the present invention other than (A) the star shaped solution-polymerized butadiene rubber is (B) a natural rubber or a natural rubber containing diene rubbers other than the star shaped solution-polymerized rubber (hereinafter referred to as "other diene rubbers").

Examples of the other diene rubbers are rubbers generally used for tires such as butadiene rubber, styrene-butadiene rubber and isoprene rubber. Among those, the butadiene rubber is preferable from a point that more reduction in fuel consumption can be achieved. When the other diene rubbers are blended with the natural rubber, the blending amount of the other diene rubbers is not more than 50% by weight of the component (B), preferably not more than 30% by weight. When the blending ratio of the other diene rubbers with the natural rubber is more than 50% by weight, for example, in case of the butadiene rubber, processability such as kneading and extruding becomes inferior, and in case of the styrene-butadiene rubber and the isoprene rubber, a hysteresis loss becomes larger as compared with natural rubbers and the rolling resistance of the manufactured tires increases.

The blending weight ratio of the star shaped solution-polymerized butadiene rubber / the natural rubber or the natural rubber containing the other diene rubbers is 20 to 55 / 80 to 45, preferably 25 to 50 / 75 to 50. When the blending amount of the star shaped solution-polymerized butadiene rubber is less than 20% by weight, stability of the shape of the extruded tread becomes inferior, and when more than 55% by weight, homogeneity of each component at the time of kneading for obtaining rubber compositions becomes worse, resulting in lower smoothness on the extruded surface, and tackiness of the rubber becomes reduced. Thus it becomes difficult to form the tires.

The carbon black having an iodine adsorption value of from 40 to 100 g/kg is blended as a filler into the rubber composition of the present invention.

The above-mentioned iodine adsorption value of the carbon black is measured by the measuring method prescribed in ASTM D1510. The iodine adsorption value of the above-mentioned carbon black is 40 to 100 g/kg, preferably 43 to 90 g/kg. When the iodine adsorption value of the carbon black is less than 40 g/kg, the rolling resistance of the tires manufactured by using the obtained rubber compositions becomes small, but tensile strength and tear strength of the rubbers become worse. When more than 100g/kg, the rolling resistance becomes larger.

Examples of the carbon blacks having an iodine adsorption value of 40 to 100 g/kg are those of such classes as Fast Extruding Furnace (commonly referred to as "FEF") and High Abrasion Furnace (commonly referred to as "HAF").

The blending amount of the carbon blacks is 30 to 55 parts (parts by weight, hereinafter the same), preferably 35 to 50 parts, per 100 parts of the above-mentioned rubber components. When the blending amount of the carbon blacks is less than 30 parts, smoothness of the extruded surface becomes worse and tensile strength and tear strength of the vulcanized rubber becomes lower. When more than 55 parts, though processability is improved, the rolling resistance of the tire manufactured of the obtained rubber composition becomes larger.

With the rubber composition for the base tread of the present invention, if necessary, there can be blended additives conventionally used for rubber compositions, for example, vulcanizing agents such as sulfur, vulcanizing activators such as zinc oxides and stearic acids, vulcanizing accelerators like thiazol accelerators such as mercaptobenzothiazol (MBT), dibenzothiazoldisulfide (MBTS), N-tert-butyl-2-benzothiazolylsulfenamide (TBBS) and N-cyclohexyl-2-benzothiazolsulfenamide (CZ), antioxidants such as N-(1,3-dimethylbutyl)-N'-phenyl-p-phenylenediamine (6c), process oils such as aromatic oil, naphtene oil and paraffin oil, waxes, organic fibers and foaming agents in such a blending amount that the purpose of "the present invention is not affected.

In the present invention, for example, among each component of which blending amount has been adjusted, the components other than the vulcanizing agents and the vulcanizing activators are first kneaded, for example, with a banbury mixer. Then the vulcanizing agents and the vulcanizing activators are added, and kneading is carried out, for example, by rolls or a banbury mixer to obtain the rubber composition for the base tread. Time and temperature required for the above-mentioned kneading are not particularly limited, and may be so adjusted that each component is kneaded uniformly.

Subsequently, the obtained rubber composition for the base tread is, for example, extruded with an extruder, being assembled with a cap tread rubber, and is then cut to produce the required tread having a two-layer structure of the cap portion and the base portion. Afterwards a tire can be manufactured with the tread by a usual method.

There is no limitation to the cap tread rubber to be used for the tires of the present invention, and such a rubber as is usually used for a cap portion of a tread having a two-layer structure may be applied.

In the tire of the present invention, the thickness of the base portion is 10 to 35%, preferably 15 to 30% of the total tread thickness. When the thickness of the base portion is less than 10%, though occurrence of the shrinkage at the base portion is lessened, saving of fuel consumption by the tire tends to be affected. When more than 35%, abrasion of the tire remarkably increases, and the base portion of the tread appears on the outer surface, and thus tire performances, particularly grip characteristic tend to lower.

Also in the tire of the present invention, for the base portion where the grip characteristic is not so important, the use of a rubber having a smaller tan $\delta$ value than that of a rubber for the cap portion where an excellent grip characteristic is required is preferable from a point that an improvement of grip characteristic of the tire and saving of fuel consumption can be sufficiently achieved at the same time. Furthermore it is preferable that the difference in tan $\delta$ value of the rubbers between the base portion and the cap portion is about 0.05 to 0.2.

The rubber composition for the base tread and the tire using the rubber composition of the present invention are explained by means of Examples, but the present invention is not intended to be limited by the Examples.

Examples 1 to 6 and Comparative Examples 1 to 8

The rubber compositions for the base tread were obtained by blending, per 100 parts of the rubber components shown in Tables 1, 2 and 3, 35 parts of a carbon black, 5 parts of an aromatic process oil, 2 parts of Sunnoc wax, 2 parts of N-(1,3-dimethylbutyl)-N'-phenyl-p-phenylenediamine (6c), 2 parts of stearic acid and 3 parts of zinc oxide, which are shown in Tables 1, 2 and 3, then kneading at about 160° to 180° C. with a banbury mixer (BB270 available from Kobe Steel, Ltd. ), adding 2 parts of sulfur and 2 parts of N-cyclohexyl-2-benzothiazolsulfenamide (CZ), and kneading at about 70° to 110° C.

The obtained rubber compositions for the base tread were extruded by means of an extruder (cold feed extruder available from Nakata Zoki Kabushiki Kaisha), being assembled with cap tread rubbers, and then were cut to the desired length to obtain the treads. The above-mentioned cap tread rubbers were made of rubber compositions obtained in the same manner as the rubber compositions for the base tread by the use of 75 parts of NS116, 25 parts of NR, 65 parts of N351, 20 parts of an aromatic process oil, 2 parts of Sunnoc wax, 2 parts of 6c, 2 parts of stearic acid, 3 parts of zinc oxide, 2 parts of sulfur and 2 parts of CZ. The thickness of the base portion of the tread was so adjusted as to be 20 to 30% of the total tread thickness.

Then by observing homogeneity of each component in the banbury mixer when preparing the rubber compositions for the base tread and assembled conditions of the rubber compositions and cap tread rubbers when producing the tread, processability was evaluated. The processability is represented by the relative figures on the basis that the processability of the Comparative Example 1 (standard tire) is assumed to be 100. The results are shown in Tables 1, 2 and 3. The smaller the figure is, the better the processability is.

After the obtained tread was allowed to stand at room temperature for 24 hours, a circumferential length, width and thickness thereof were measured to evaluate a shrinkage in comparison with those measured just after extruded. The results are shown in Tables 1, 2 and 3. Figures in Tables 1, 2 and 3 are relative ones on the basis that the figure of Comparative Example 1 is assumed to be 100. The smaller the figure is, the better.

The tire of 185/70R14 SP7 was manufactured by the use of the tread having been allowed to stand at room temperature for 24 hours.

The physical properties of the obtained tire, such as viscoelasticity, uniformity, and rolling resistance were evaluated in the manner mentioned below. The results are shown in Tables 1 and 2. The Table 3 shows Comparative Example 7 in which the tire if of a normal one-layer structure but not of a cap/base structure and a publicly known blended rubber of a low rolling resistance is used for the tread. Comparative Example 8 shows a tire of a cap/base structure in which the rubber of Comparative Example 7 was used for the cap portion and the rubber of Comparative Example 1 was used for the base portion.

(1) Viscoelasticity (tan $\delta$)

Rubber samples were cut out from a cap portion and a base portion of a tire to prepare rubber pieces of about 2 mm thick, about 4 mm wide and about 40 mm long. With the use of those rubber pieces, tan $\delta$ values were measured under the conditions of 10% of initial elongation, 2% of dynamic strain, 10 Hz of vibration frequency and 70° C. of temperature by the use of a viscoelasticity spectrometer (available from Kabushiki Kaisha Iwamoto Seisakusho). The tan $\delta$ value of the rubber of the cap portion was 0.15.

Also Tables 1, 2 and 3 show the tan $\delta$ values of the rubber of the base portion and the differences in the tan $\delta$ value between the rubber of the cap portion and the rubber of the base portion.

(2) Uniformity

Uniformity of a tire shape was observed under the conditions of 2 ksc of air pressure, 419 kg of load and 14×5J of a wheel size by the use of a uniformity machine (LT-TUGM available from Kobe Steel, Ltd.).

(3) Rolling resistance

Rolling resistance of a tire was measured under the conditions of 2 ksc of air pressure, 400 kg of load, 14×5.5J of a wheel size and 80 km/hr of a speed by the use of a rolling resistance machine (available from T & T Co., Ltd.).

The above uniformity (2) and rolling resistance (3) are indicated by the relative values on the basis that the value of Comparative Example 1 is assumed to be 100. The smaller the figures are, the better.

The compositions of the cap tread rubber and the symbols shown in Tables 1, 2 and 3 are as shown below:

BR1250: Star shaped solution-polymerized butadiene rubber (available from Nippon Zeon Co., Ltd., rate of coupling with tin tetrachloride: 30 to 40%, molecular weight distribution (Mw/Mn): 1.6 to 1.7, content of vinyl bond: 17% by weight, low-cis type)

BR340L: Butadiene rubber (available from Ube Industries, Ltd., microstructure having about 98% by mole of cis content, about 1% by mole of trans content, about 1% by mole of vinyl content, glass transition temperature: −108° C., high-cis type)

NS116 : Star shaped solution-polymerized styrene-butadiene copolymer rubber (available from Japan Zeon Co., Ltd., content of styrene: 20% by weight, content of vinyl bond of butadiene: 60% by weight, rate of coupling with tin tetrachloride: 30 to 40%, molecular weight distribution (Mw/Mn): 1.5 to 1.7, glass transition temperature: −33° C.)

Trial product

SBR: Star shaped solution-polymerized butadiene copolymer rubber (available from Sumitomo Chemical Co., Ltd., content of styrene: 25% by weight, content of vinyl bond of butadiene: 40% by weight, rate of coupling with silicon dioxides: 50 to 60%, molecular weight distribution (Mw/Mn): 1.5 to 1.7, glass transition temperature: −41° C.)

NR : Natural rubber

N550 : Carbon black (iodine adsorption value (hereinafter referred to as "IA") by measuring method prescribed in ASTM D 1510: 43 g/kg, FEF class)

N330 : Carbon black (IA: 82 g/kg, HAF class)

N339 : Carbon black (IA: 90 g/kg, HAF class)

N351 : Carbon black (IA: 68 g/kg, HAF class)

At the time of solution polymerization, an alkyl lithium was used as a polymerization initiator for any of the above-mentioned BR1250, NS116 and the trial product SBR.

TABLE 1

| | Composition (parts by weight) | | | Physical Properties | | | | | | |
| --- | --- | --- | --- | --- | --- | --- | --- | --- | --- | --- |
| | | | | Shrinkage (mm) | | | Viscoelasticity | | | |
| Examples | Rubber components | carbon black | Processability | Circumferencial length | Width | Thickness | tan δ of base rubber | Difference | Uniformity | Rolling resistance |
| 1 | NR (75) BR1250 (25) | N550 (35) | 100 | 65 | 55 | 70 | 0.04 | 0.11 | 85 | 97 |
| 2 | NR (60) BR1250 (40) | N550 (35) | 100 | 60 | 50 | 63 | 0.04 | 0.11 | 80 | 97 |
| 3 | NR (75) BR1250 (25) | N330 (35) | 95 | 70 | 65 | 70 | 0.06 | 0.09 | 88 | 98 |
| 4 | NR (75) BR1250 (25) | N351 (35) | 93 | 65 | 60 | 67 | 0.05 | 0.1 | 80 | 96 |
| 5 | NR (75) BR1250 (25) | N339 (35) | 95 | 68 | 60 | 65 | 0.06 | 0.09 | 86 | 96 |
| 6 | NR (50) BR1250 (50) | N351 (50) | 98 | 55 | 50 | 60 | 0.08 | 0.07 | 76 | 102 |

TABLE 2

| | Composition (parts by weight) | | | Physical Properties | | | | | | |
| --- | --- | --- | --- | --- | --- | --- | --- | --- | --- | --- |
| | | | | Shrinkage (mm) | | | Viscoelasticity | | | |
| Comp. Ex. | Rubber components | carbon black | Processability | Circumferencial length | Width | Thickness | tan δ of base rubber | Difference | Uniformity | Rolling resistance |
| 1 | NR (75) BR340L (25) | N550 (35) | 100 | 100 | 100 | 100 | 0.08 | 0.07 | 100 | 100 |
| 2 | NR (25) BR340L (75) | N550 (35) | 150 | 95 | 97 | 98 | 0.07 | 0.08 | 100 | 99 |
| 3 | NR (25) BR1250 (75) | N550 (35) | 120 | 60 | 55 | 65 | 0.03 | 0.12 | 80 | 95 |
| 4 | NR (50) BR1250 (50) | N351 (60) | 90 | 55 | 52 | 57 | 0.11 | 0.04 | 75 | 110 |
| 5 | NR (50) NS116 (50) | N351 (45) | 98 | 53 | 55 | 65 | 0.11 | 0.04 | 75 | 113 |
| 6 | NR (50) Trial product SBR (50) | N351 (45) | 103 | 95 | 93 | 95 | 0.13 | 0.02 | 99 | 115 |

TABLE 3

| Comp. Ex. | Tread structure | Composition (parts by weight) | | | Physical Properties | | | | | | | |
|---|---|---|---|---|---|---|---|---|---|---|---|---|
| | | Rubber components | | carbon black | Process- ability | Shrinkage (mm) | | | Viscoelasticity | | Uni- formity | Rolling resistance |
| | | | | | | Circumfer- encial length | Width | Thick- ness | tan δ of base rubber | Dif- ference | | |
| 7 | One-layer structure (Cap) | NR NS116 | (25) (75) | N339 (65) | 130 | 50 | 48 | 47 | 0.16 | — | 66 | 124 |
| 8 | Cap/Base structure* | NR BR340L | (75) (25) | N550 (35) | 100 | 101 | 100 | 101 | 0.08 | 0.08 | 102 | 103 |

*Note:
The rubber of Comparative Example 7 was used as the cap rubber for Comparative Example 8.

Comparison of the results shown in Table 1 with those shown in Table 2 indicates that, in Examples 1 to 6, processability is excellent in producing the rubber compositions for the base tread and the treads using those rubber compositions, and also that shrinkage in any directions of circumferential length, width and thickness is less with respect to the treads obtained in Examples 1 to 6. Also in case of tires obtained in Examples 1 to 6, it could be understood that the tan δ values of the rubbers of the base portion are all relatively as small as not more than 0.08 and are smaller than those of the rubbers of the cap portion by 0.07 to 0.11, which indicates a very excellent uniformity of the shape and the achievement of sufficient fuel saving. It could also be understood that in case of the tires obtained particularly in Examples 1 to 5, rolling resistances are small and lowering of fuel consumption was achieved. As regards the tire obtained in Example 6, despite that a blending amount of a carbon black is relatively larger, the rolling resistance is recognized to be not so high. The rolling resistance or the balance of uniformity and rolling resistance is much more excellent as compared with Comparative Examples 7 and 8 in Table 3.

The tire of the present invention, in which the rubber composition for the base tread is used for the base portion of the tread having a two-layer structure can, not only achieve lowering of fuel consumption, but also provide such effects that shrinkage is difficult to occur particularly at the base portion of the tread, a shape of the extruded tread is difficult to change and a shape uniformity after vulcanization is excellent, even in case that the tire is allowed to stand for a while after extruding and cutting. Also the rubber composition for the base tread of the present invention has an effect of providing a good processability.

What is claimed is:

1. A rubber composition for a base tread, which is obtainable by blending, per 100 parts by weight of a rubber component, 30 to 55 parts by weight of a carbon black having an iodine adsorption value of from 40 to 100 g/kg, said rubber component comprising
    (A) 20 to 55% by weight of a star shaped solution-polymerized polybutadiene rubber having a rate of coupling with tin tetrachloride of not less than 25% and a molecular weight distribution (weight average molecular weight/number average molecular weight) of 1.2 to 3, and
    (B) 45 to 80% by weight of a natural rubber or a natural rubber containing a diene rubber other than a star shaped solution-polymerized rubber in an amount of not more than 50% by weight.

2. The rubber composition for the base tread of claim 1, wherein the diene rubber other than the star shaped solution-polymerized rubber is butadiene rubber.

3. A tire wherein the rubber composition for the base tread of claim 1 is used for a base portion of the tread having a two-layer structure of a cap portion and the base portion.

4. The tire of claim 3, wherein a thickness of the base portion is 10 to 35% of a total tread thickness.

5. The tire of claim 3, wherein a tan δ value of the rubber at the base portion is smaller than a tan δ value of the rubber at the cap portion.

6. The tire of claim 3, wherein the star shaped solution-polymerized polybutadiene rubber has two peaks in the molecular weight distribution curve thereof.

7. The rubber composition according to claim 1, wherein component (A) is a mixture of said star shaped solution-polymerized polybutadiene rubber and a star shaped solution-polymerized styrene-butadiene rubber, the amount of said star shaped solution polymerized styrene-butadiene rubber is at most one half of the amount of said star shape solution polymerized polybutadiene rubber.

8. The rubber composition according to claim 1, wherein the blending weight ratio of component (A) to component (B) is from 20 to 50 : 75 to 50.

* * * * *